US010211716B2

(12) United States Patent
Van Der Bijl et al.

(10) Patent No.: US 10,211,716 B2
(45) Date of Patent: Feb. 19, 2019

(54) MAGNETIC COUPLING ASSEMBLY

(71) Applicant: Zytec Technologies B.V., Vlaardingen (NL)

(72) Inventors: Dirk Geert Van Der Bijl, Etten-Leur (NL); Robert Lalesse, Zevenaar (NL)

(73) Assignee: ZYTEC TECHNOLOGIES B.V., Vlaardingen (NL)

( * ) Notice: Subject to any disclaimer, the term of this patent is extended or adjusted under 35 U.S.C. 154(b) by 115 days.

(21) Appl. No.: 15/125,677

(22) PCT Filed: Mar. 13, 2015

(86) PCT No.: PCT/NL2015/050164
§ 371 (c)(1),
(2) Date: Sep. 13, 2016

(87) PCT Pub. No.: WO2015/137814
PCT Pub. Date: Sep. 17, 2015

(65) Prior Publication Data
US 2017/0005558 A1 Jan. 5, 2017

(30) Foreign Application Priority Data

Mar. 13, 2014 (NL) .................................... 2012431
Jul. 18, 2014 (NL) .................................... 2013219

(51) Int. Cl.
*H02K 49/04* (2006.01)
*H02K 7/11* (2006.01)
*H02K 7/06* (2006.01)

(52) U.S. Cl.
CPC ............. *H02K 49/046* (2013.01); *H02K 7/11* (2013.01); *H02K 7/06* (2013.01); *H02K 2201/03* (2013.01); *H02K 2213/09* (2013.01)

(58) Field of Classification Search
CPC .......... H02K 49/046; H02K 7/06; H02K 7/11; H02K 2201/03; H02K 2213/09
(Continued)

(56) References Cited

U.S. PATENT DOCUMENTS 2,280,736 A * 4/1942 Winther ............. B61D 27/0072
310/95
5,668,424 A 9/1997 Lamb
(Continued)

FOREIGN PATENT DOCUMENTS

| CN | 101814820 A | 8/2010 |
| CN | 201629653 U | 11/2010 |

(Continued)

OTHER PUBLICATIONS

Machine translation of CN 103107675 A (May 2013).*
International Search Report and Written Opinion dated Jun. 3, 2015 for PCT/NL2015/050164 filed Mar. 13, 2015.

*Primary Examiner* — Michael Andrews

(57) ABSTRACT

The invention relates to a magnetic coupling assembly for associating a first rotatable shaft to a second rotatable shaft, the magnetic coupling assembly comprising:—a rotatable first hub to be connected to the first rotatable shaft, the first hub comprising a magnet rotor comprising a plurality of permanent magnets;—a rotatable second hub to be connected to the second rotatable shaft, the second hub comprising a conductor housing comprising at least one conductor positioned at a distance from a side of the magnet rotor facing the second rotatable shaft; wherein at least one of the second hub and first hub comprises an inner hub part and an outer hub part, wherein the hub parts are configured to allow the outer hub part to be axially movable over the inner hub part to adjust the axial position of the at least one conductor relative to the magnet rotor.

14 Claims, 7 Drawing Sheets

(58) Field of Classification Search
USPC .................................. 310/78, 95, 94, 93, 76
See application file for complete search history.

(56) References Cited

U.S. PATENT DOCUMENTS 5,880,548 A * 3/1999 Lamb .................. H02K 49/046
310/103
2012/0019087 A1 1/2012 Jones

FOREIGN PATENT DOCUMENTS

| CN | 103107675 A * | 5/2013 | ........... H02K 49/046 |
| JP | H05252728 A | 9/1993 | |
| WO | 2011/018015 A1 | 2/2011 | |
| WO | 2013/009903 A2 | 1/2013 | |

* cited by examiner

MAGNETIC COUPLING ASSEMBLY

The present invention relates to a magnetic coupling assembly for coupling a first rotary shaft and a second rotary shaft. The invention also relates to a method of adjusting at least one air gap in a magnetic coupling assembly.

Magnetic coupling assemblies for coupling a first shaft, for instance a drive or motor shaft, to a second shaft, for instance a load or machine shaft, are known as such. A magnetic coupling assembly may comprise one or more magnet rotors, with each magnet rotor having a respective set of permanent magnets. Each magnet rotor of the known magnetic coupling assembly is associated with at least one electromagnetic inductor rotor spaced apart from the magnet rotor. Torque may be transferred from the first shaft to the second shaft, with the speed of the load shaft reduced with respect to the speed of the drive shaft, without the drive shaft being in contact with the load shaft.

In another type of magnetic coupling assemblies the assembly comprises one rotatable central magnetic rotor and a pair of conductors, the conductors being made of electro-conductive material, arranged at either side of the central magnetic rotor and mounted on a rotatable conductor housing (herein also referred to as "conductor cage" or simply "cage").

An advantage of magnetic coupling assemblies relative to the more traditional couplings is the contactless torque/speed transmission, which provides the coupling assemblies with a large lifespan, low maintenance costs and high energy efficiency. However, the known magnetic coupling assemblies have installation issues since the magnetic rotor and conductors need to be spaced apart in a defined position. Furthermore installation may be difficult as a result of the large magnetic forces that occur in the assembly.

Generally, alignment of the rotary shafts in radial direction is no real issue. However, there is need for axial alignment because the axial forces are rather high and the accurate dimension of the air gaps between the central rotor and the conductors is important for the correct functioning of the magnetic coupling. At the installation phase the axial alignment is typically accomplished by moving the machinery at the driver and/or the load side of the coupling, for instance by moving the drive motor and/or the pump. In practice the axial alignment of a magnetic coupling in the installation phase is a difficult task and is labor intensive, for instance because of the magnetic attraction between the elements of the coupling. Especially in situations wherein the motor and load extend in a vertical direction and need to be installed using shims and the like, it is difficult to achieve the required effective distances of the air gaps.

Magnetic couplings with positioning mechanisms for positioning the central rotor and the conductor rotors relative to each other during operation of the coupling (i.e. after the installation phase) are known as such. These mechanisms are intended to synchronously adapt the air gaps between the central rotor and each of the conductors in order to vary the transmission ratio of the coupling. As mentioned above, the variation of the transmission ration is typically performed when the coupling is in operation, for instance when the rotors of the coupling are rotated. An example of such positioning mechanism is disclosed in CN 103107675 A. If the left air gap between the left conductor disk and the left magnetic disk is increased, the right air gap between the right conductor disk and the right magnetic disk is increased to the same extent. Therefore the known positioning mechanism is unsuitable for proper alignment of the rotors of the coupling at the installation phase. For instance, if one of the air gaps is larger than the other air gap, a repositioning of the rotors to provide air gaps of equal widths is not possible.

It is an object of the invention to provide a magnetic coupling assembly allowing an easy and reliable way of setting the air gaps between the rotor and respective conductors.

It is a further object of the invention to provide a magnetic coupling assembly allowing an easy and reliable way of providing for air gap equalization.

It is a further object of the invention to provide a magnetic coupling assembly allowing an easy and reliable way of setting the air gaps between the rotor and respective conductors, without needing to move the drive motor (shaft) or the load shaft.

According to a first aspect of the invention a magnetic coupling assembly for associating a first rotatable shaft to a second rotatable shaft, the magnetic coupling assembly comprising:

a rotatable first hub to be connected to the first rotatable shaft, the first hub comprising a magnet rotor comprising a plurality of permanent magnets;

a rotatable second hub to be connected to the second rotatable shaft, the second hub comprising a conductor housing comprising a first inductor rotor connected to the second hub and arranged at a distance on one side of the magnet rotor facing the second rotatable shaft and a second inductor rotor arranged at the opposite side of the magnet rotor;

wherein at least one of the second hub and first hub comprises an inner hub part and an outer hub part, wherein the hub parts are configured to allow the outer hub part to be axially movable over the inner hub part to adjust the axial position of the inductor rotors relative to the magnet rotor; and wherein the conductor housing also comprises at least one connector unit for connecting the first inductor rotor to the second inductor rotor, the at least one connector unit being configured to control the axial distance between the first and second inductor rotor.

By allowing a controlled and accurate axial movement of the second hub relative to the first hub, the mounting of the drive and load (for instance, a drive motor and a pump) can be facilitated. The construction allows for the precise axial alignment and control as necessary for a magnetic coupling. After positioning the outer hub may be fixated on the inner hub. The inner hub may be fixated on either of the sides of the coupling assembly.

The precise axial alignment of the first and second hubs and therefore of the elements connected to the first and second hubs, such as the at least one magnet rotor and the at least one inductor rotor, allows an air gap adjustment (more or less) without moving motor or load shaft enabling field adjustment to suit or adjust to actual load conditions, for instance in case of balancing a multi-drive installation (conveyor, crane), decreasing the speed of the load (pump, fan, etc.) for energy saving purposes, increasing the speed of the load (pump, fan, etc.) for more output, and adjusting the coupling peak torque to prevent motor or transmission overload. Furthermore the coupling assembly may save re-installation effort and labor after repair of pump and motor.

Typically the air gaps are equalized at the installation phase, i.e. before the coupling is actually in operational condition. However, the air gaps may also be equalized in a later stage, for instance after prolonged operation of the coupling, for instance when the coupling is first operated at relative low temperature conditions and then at higher temperature conditions. For instance, he (independent) movability of the first and second hubs may improve the coupling performance in the sense that it allows easy compensation of unequal air gap in operating conditions. The installed air gaps may be equal in cold conditions, but after start thermal expansion, vibrations, load bending, pump piping under pressure pushing the pump away may cause the air gaps to become different. The balancing can be more easily accomplished in the coupling assembly defined herein. According to embodiments of the invention a fine adjustment of the magnet rotor axial position may be accomplished, for example in order to equalize slip heat load between the inductor rotors (for instance, between the inductor plates). More generally, the coupling assembly makes it possible to equalize in a simple manner the effective coupling load on the rotors.

According to an embodiment of the invention the connector unit comprises a spacer configured connected to both the inner surface of the first inductor rotor and the inner surface of the second inductor rotor, the spacer preferably being configured to position the first and second inductor rotors relative to each other at a selected axial distance from a plurality of axial distances. The spacer can be embodied to have an adjustable length. In other embodiments the spacer may be movable in associated openings in the inductor rotors. The inductor rotors are moved in axial direction, for instance by rotating the spacer that is threadingly engaged in openings in the inductor rotors, until they are spaced apart at a suitable distance.

According to embodiments of the invention the outer hub and inner hub comprise respective threads to threadingly engage on each other, the threads configured to move the outer and inner hub relative to one another by rotating the outer hub part relative to the inner hub part.

In an embodiment of the invention the conductor housing comprises at least one inductor rotor (conductor) positioned at a first distance from a side of the magnet rotor facing the second rotatable shaft and at least one inductor rotor positioned at a second distance from a side of the magnet rotor facing the first rotatable shaft so as to define respective air gaps between the inductor rotors and the magnet rotor.

In embodiments of the invention the magnetic coupling assembly is configured to independently control the width of the first and second air gap by a combination of adapting the position of the inductor rotors relative to the magnet rotor by moving the outer hub relative to the inner hub and adapting the axial distance between the first and second inductor rotors by changing the length of the connector unit. Because the air gaps my be independently (and individually) controlled, the correct distances between the inductor rotors and magnet rotors (for instance in the installation phase) can be easily set and a correct alignment may be achieved.

In order to maintain the hub parts in position once the hub parts have been moved in axial direction, the inner hub part may be fixated relative to the outer hub part by at least one fixation element. The fixation element may be configured to resist rotation of the outer hub part relative to the inner hub part and thereby avoid the inadvertent axial movement of the hub parts.

The fixation of the hub parts can be accomplished in several ways. In an embodiment the fixation element comprises a clamping device configured to clampingly attach the outer hub part to the inner hub part. For instance, the fixation element may comprise:

a conical element, preferably a conical ring, ring positioned between the outer and inner hub part and at least partly surrounding the inner hub part;

a pressing element configured to be inserted between the conical element and at least one of the outer and inner hub part.

In embodiments of the invention the magnet rotor extends in radial direction relative to the axial direction defined by the concentric first and second hub. The conductor housing may be configured to at least partly surround this magnet rotor. More specifically, in further embodiments of the invention, the conductor housing comprises a first inductor rotor connected to the second hub and arranged at one side of the magnet rotor, a second inductor rotor arranged at the opposite side of the magnet rotor, and at least one connector unit for connecting the first inductor rotor to the second inductor rotor. A first electro-conductive conductor may be arranged between the first inductor rotor and magnet rotor. The distance between the first inductor rotor (also referred to as the conductor rotor) and the side of the magnet rotor facing the inductor rotor defines first air gap. A second electro-conductive conductor is arranged between the second inductor rotor and magnet rotor and similarly defines a second air gap.

The axial position of the first and second conductor relative the magnet rotor and/or relative to the first and second inductor rotor may be varied by the connection unit. More specifically, the connector unit controls the axial distance between the conductors while the axially movable outer hub part and inner hub part control the axial position of the first and second conductor relative to the magnet rotor (or vice versa). The combination of the two control mechanisms enables selective and individual variation of the first and second air gaps.

In practice one starts with setting the distance between the conductors, i.e. the distance between the inductor/conductor rotors to which the conductors are mounted, by operating the connection unit. Once a correct mutual distance has been set, then the individual air gaps are set by operating the inner and outer hub parts. The hub parts allow the position of the magnet rotor in the space between the conductors to be easily adjusted by one single operation, for instance by rotating the inner hub and outer hub relative to each other.

The first and second air gaps may have an equal effective distance (so that the magnet rotor is effectively centred between the inductor rotors), but in other embodiments the distances are not equal, at least not equal at each radial position (magnet rotor off centre)

According to embodiments of the invention the at least one connector unit comprises a spacer bolt assembly comprising a spacer bolt threadinlgy engaged by a spacer sleeve and configured to control the axial distance between the inductor rotors by rotation of the spacer bolt relative to the spacer sleeve.

According to another aspect of the invention a method is provided of associating a first rotatable shaft to a second rotatable shaft in a magnetic coupling assembly as defined herein, the method comprising:

arranging the magnetic coupling assembly between a first and second rotatable shaft;

connecting a rotatable first shaft and a rotatable second shaft to a rotatable first hub and second hub of the magnetic coupling assembly;

moving the outer hub part in axial direction over the inner hub part to adjust the axial position of the at least one conductor relative to the magnet rotor.

In an embodiment of the invention the method comprises changing the distance between the first and second conductor by increasing or decreasing the length of the connection units and changing the position of the first and second conductor relative to the magnet rotor by moving the outer hub in axial direction relative to the inner hub. Preferably the length of the connection units is changed first and only after the length has been properly set, the positioning of the magnet rotor with respect to the one or more conductors is performed. However, performing the method in the reverse order is conceivable as well.

The method may comprise controlling the width of the first air gap independently from the width of the second air gap. The controlling of the width of the first (or second) air gap may comprise a combination of adapting the position of the inductor rotors relative to the magnet rotor by moving the outer hub relative to the inner hub and adapting the axial distance between the first and second inductor rotors by changing the length of the connector unit.

Further advantages, features and details of the present invention will be elucidated on the basis of the following description of several embodiments thereof. Reference is made in the description to the accompanying figures, in which.

Figure 1:
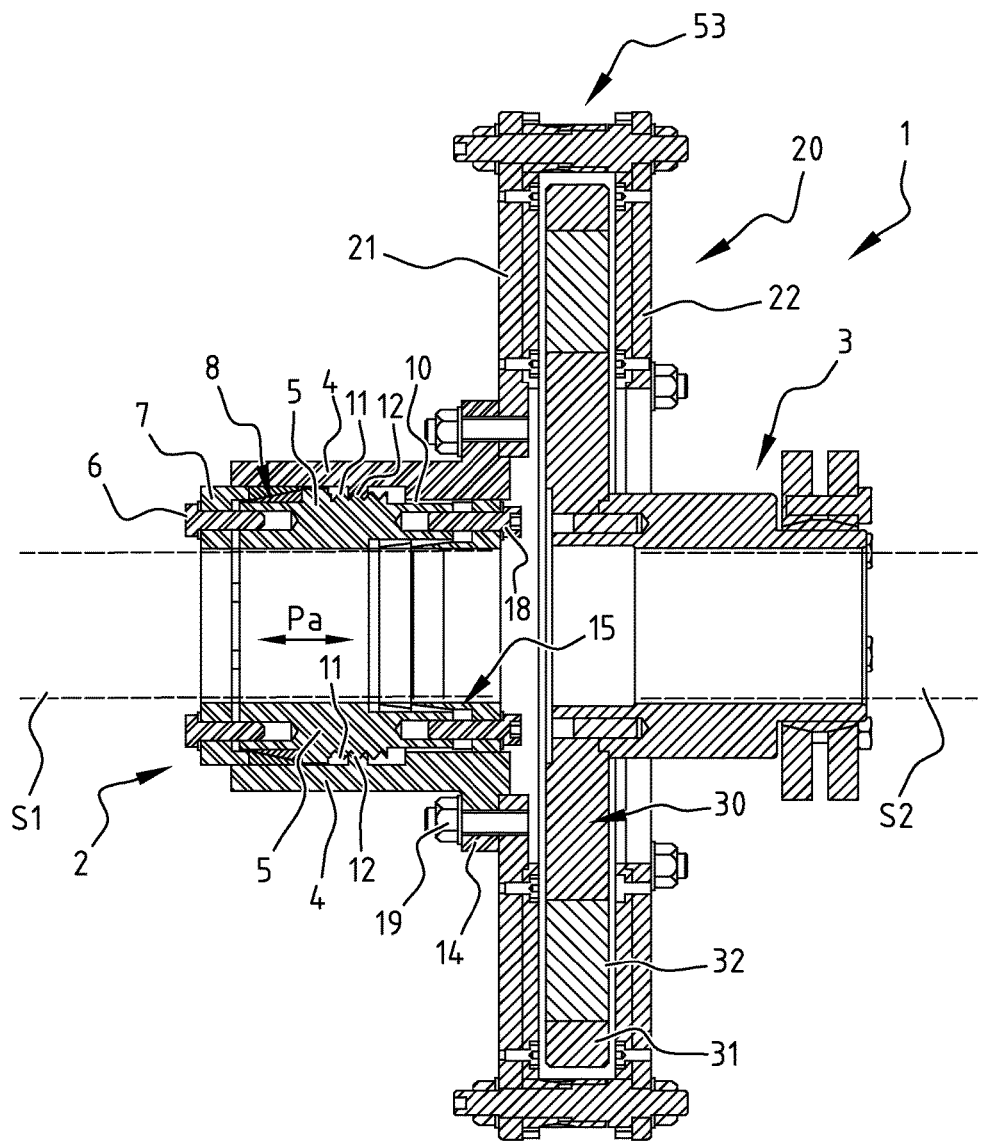
FIG. 1 is a partly taken away schematic view in cross-section of an embodiment of the coupling assembly according to the invention, connected between a drive motor and a load.

Current practice is moving the whole motor with the fixedly mounted magnetic coupling assembly with a very high accuracy, typically a 0.1 mm accuracy. This is very difficult because when loosening the motor bolts, the magnet force will attract the motor. With vertical motors it is hardly possible to adjust motor position axially, as this means shimming the motor up or down. FIGS. 1-4 show an embodiment of a magnetic coupling assembly 1 according to an embodiment of the present invention wherein the axial positioning can be accomplished in an easier and more reliable manner.

The magnetic coupling assembly may be connected to a first rotatable shaft ($S_1$) (herein also referred to as a drive shaft or motor shaft) of a driving motor, for instance an electric engine, and to a second rotatable shaft ($S_2$) (herein also referred to as a load shaft or machine shaft) of a load, for instance a pump or similar device. The first and second shafts are releasably connected to, for instance assembled on, respectively a motor side hub 2 and a load side hub 3 of the magnetic coupling assembly 1, for instance through means of respective clamping sleeves or similar coupling devices. The magnetic coupling assembly is configured to control the rotational speed of the load shaft, at a speed equal or reduced from the rotational speed of the drive shaft in an essentially contactless manner.

In the magnetic coupling assembly 1 a clearance exists between the input hub 2 and output hub 3 and therefore between the first and second shafts ($S_1$, $S_2$) mounted therein so that there is essentially no physical connection at any point between the hubs (and the shafts). The clearance allows the two shafts to rotate and transmit power while being slightly out of alignment without the vibration that would occur if they were connected by mechanical couplings.

The magnetic coupling assembly 1 comprises an inductor assembly 20 having two inductor rotors 21, 22 (herein also referred to as conductor rotors 21,22) (connected to a common central hub part 4 of the hub 2 to rotate synchronously. More specifically, the inductor rotor 21 is directly connected to the outer hub part 4 via a radial flange 14 using a number of bolts 19. The other inductor rotor 22 is not connected to the outer hub part 4, but is connected to the inductor rotor 21 through a number of connection units 53 at positions close to the circumference of the inductor rotors 21,22.

The magnetic coupling assembly 1 also comprises a magnet rotor assembly 30. The magnet rotor assembly 30 is coupled to the load side hub 3 which is connected to the load shaft (alternatively, to the motor drive shaft), while the two inductor rotors 21,22 are attached to the drive side hub 2, more specifically tot the outer hub part 4 thereof.

The magnet rotor assembly 30 has a single magnet rotor 31 arranged centrally between the two inductor rotors 21,22. The magnet rotor 31 contains a number of permanent magnets 32, loaded in alternating north/south pattern and positioned near the outer circumference of the rotor 31. The permanent magnets are spaced by air gaps from the respective inductor rotors 21,22. Rotation of the first or second hub 2,3 results in rotation of the other shaft by magnetic action without there being any direct mechanical connection between the first and seconds shafts. More specifically, torque may be transferred between the magnet rotor and the inductor rotors and thereby between the first and second shaft via Lenz's law.

Figure 2:
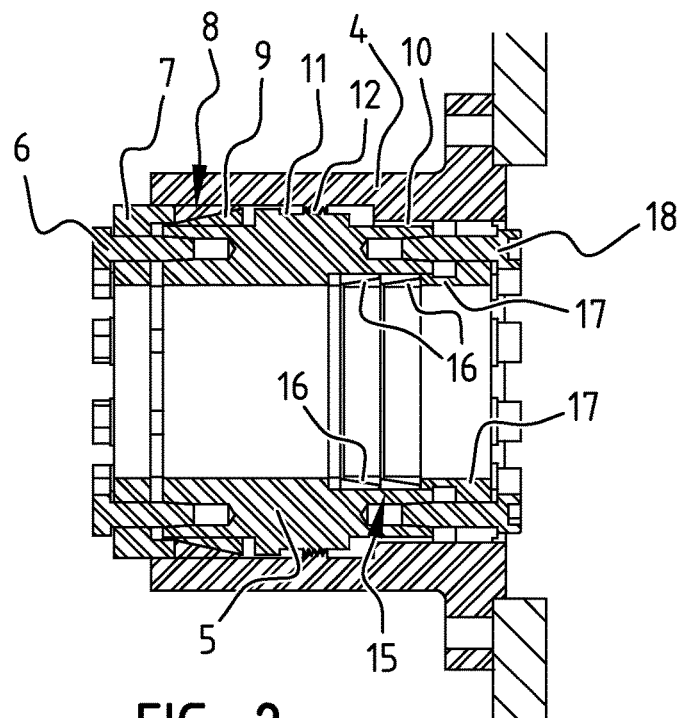
FIG. 2 is a cross-section of the embodiment of the inner hub part and outer hub part of the magnetic coupling assembly.
Figure 3:
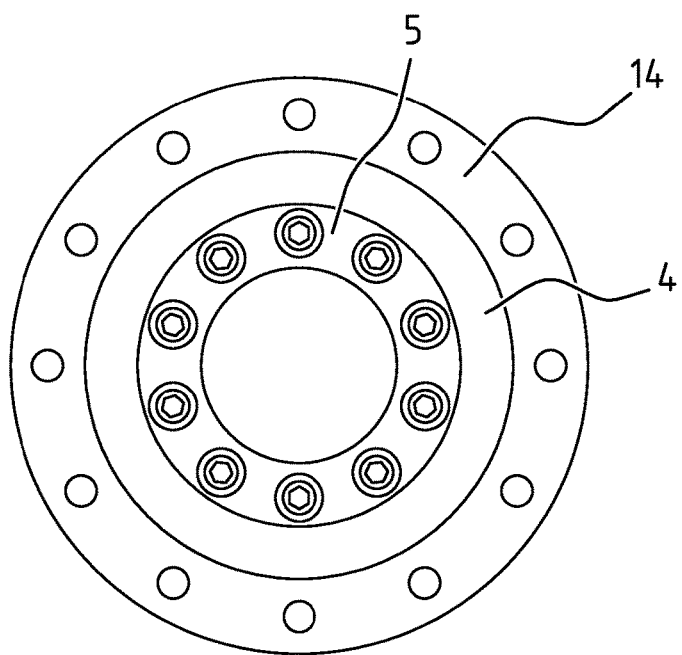
FIG. 3 is a front view of the embodiment of FIG. 2.

FIGS. 2 and 3 show the first and second hubs 2,3 in more detail. The first hub 2 comprises an outer hub part 4 and an inner hub part 5. The inner hub part 5 is fastened to the input shaft $S_1$. The inner hub part 5 may for instance be connected to the input shaft by a clamping set 15. The set may comprise of a clamping device including fastening bolts or of one or more sets of conical rings 16 around the shaft and pressed together with a pressing element 17 and fastened with bolts 18 in the inner hub part 5. The inner hub part 5 bears a bushing 10, for instance made of bronze, a synthetic material or a similar material. The bushing 10 supports the outer hub part 4 and allows the outer hub part 4 to be rotatable with respect to the inner hub part 5, as will be described hereafter.

A thread 11 is provided on the inner hub part 5 and a thread 12 is provided on the outer hub part 4. As mentioned above the hub parts may be rotated relative to each other. Rotation of one of the hub parts relative to the other causes an axial displacement ($P_a$) of the hubs relative to each other and thereby enables an precise axial positioning of the hub parts 4,5. In operation, i.e. in the situation wherein both shafts $S_1$,$S_2$ are connected to the coupling assembly 1, the axial movement of the outer hub part 4 relative to the inner hub part 5 enables the axial displacement of the inductor assembly 20 relative to the magnet rotor assembly 30 connected to the shaft $S_2$. In other words, the relative axial displacement of the hub parts 4,5 (by rotation of a hub part relative to the other hub part) enables the axial displacement of the hub parts including the magnet rotor and inductor rotors connected thereto and therefore the setting of the air gap(s).

As mentioned above the outer hub part 4 is screwed on the inner hub part 5. By turning the outer hub part 4 around the inner hub part 5, the coupling can be rotated in place axially. The outer hub part 4 slides over the bushing 10. Once the hub parts 4,5 have reached their correct axial position, the outer hub part 4 is fixated on the inner hub part 5, for instance by a locking set or a clamping set 8. The clamping set 8 may comprise of a clamping device including fastening bolts or of one or more sets of conical rings 9 around the inner hub part 4 and pressed together with a pressing element 7 and fastened with bolts 6 screwed in the inner hub part 5. In fixated position the inner hub 5 and outer hub 4 cannot rotate relative to each other, so that rotation of the shaft $S_1$ and therefore of inner hub part 5 is transferred to the outer hub part 4 and therefore to the inductor assembly 20. The rotation of the inductor assembly is transferred to the magnet rotor assembly 30 and from the magnet rotor assembly 30 to the shaft $S_2$.

Figure 4:
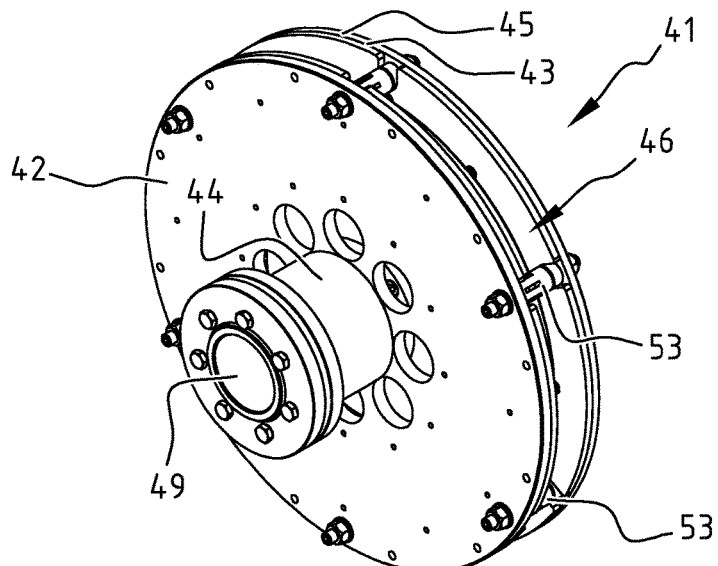
FIG. 4 is a view in perspective of a further embodiment of the invention.
Figure 5:
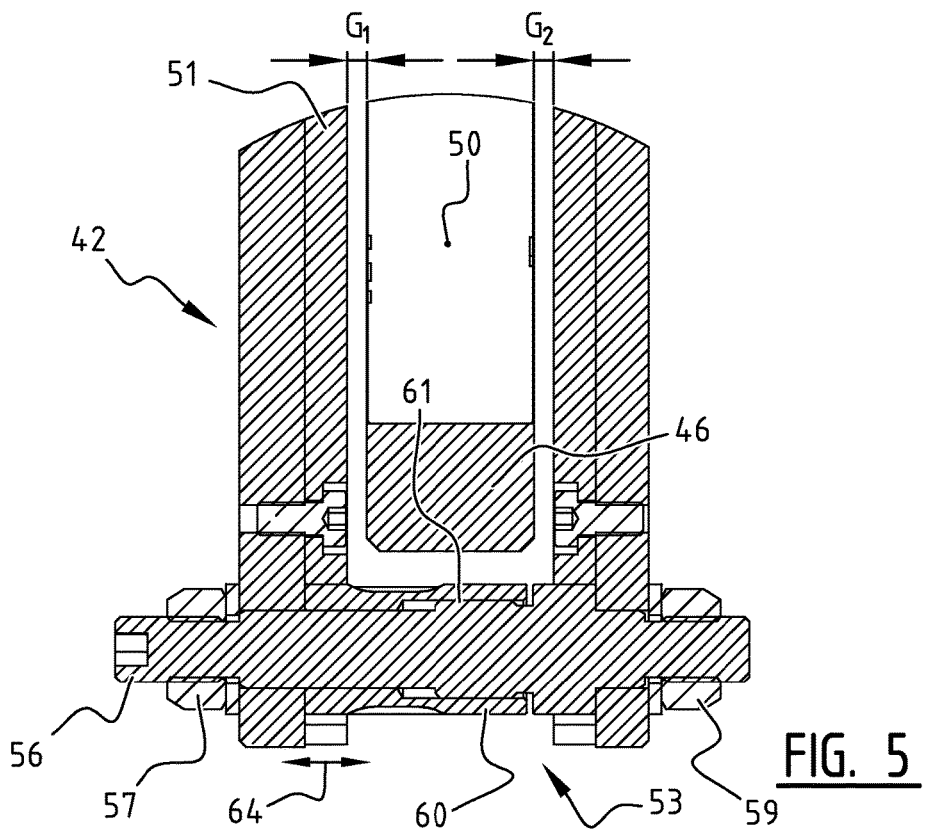
FIG. 5 is a cross-section of a detail of the embodiment of FIG. 4.

FIGS. 4-8 show a further embodiment of the present invention. FIG. 4 shows a portion of a magnetic coupling assembly 41. The assembly 41 comprises a first inductor rotor 42 and a second induction rotor 43. In the space between the first and second induction rotor the magnet rotor 46 including a number of permanent magnets 50 is arranged. At the inner side of the first inductor rotor 42 electro-conductive material 51 is arranged, while at the inner side of the second inductor rotor 43 similar electro-conductive material 52 is mounted. The first and second inductor rotors 42,43 are connected to each other at a number of connection points close to the outer circumference of the rotors using respective connection units 53.

The figures show that the first inductor rotor 42 is connected to a first hub part 44. The second inductor rotor 43 is connected only to the first inductor rotor 42 by means of the connection units. The magnet rotor 46 is connected to a second hub (not shown in the figures). The first (outer) hub part 44 is connected to a second (inner) hub part 49. The hub parts 44,49 may be displaced in axial direction by turning the one hub part relative to the other. The axial displacement of the hub parts control the position of the inductor rotors relative to the magnet rotor. During the axial displacement of the hub parts and therefore of the relative axial displacement of the inner hub part 49 and the inductor rotors 42,43, the position of the magnet rotor 46 in the space between the opposing first and second inductor rotors 42,42 changes. However, the distance between the two inductor rotors 42,43 remains the same. In order to vary this distance and therefore to vary the position of the magnet rotor 46 relative to both inductor rotors the length of the above-mentioned connection units 53 may be varied.

FIGS. 5, 6A-C, 7-9 show an embodiment of the connection units 53 in more detail. connector unit comprises a spacer configured to be connected to both the inner surface of the first inductor rotor and the inner surface of the second inductor rotor. The spacer is configured to position the first and second inductor rotors relative to each other at a selected axial distance from a plurality of axial distances (i.e. a discrete number of distances or a continuum of distances).

Figure 6A:
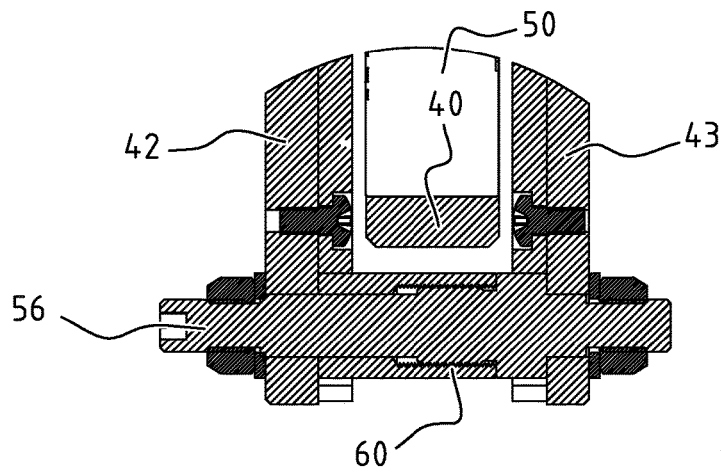
FIG. 6A-6C are detailed cross-sections of the outer end of the magnet rotor and induction rotors, wherein the induction rotors are coupled with at least one adjustable connection unit, in case of small air gaps, intermediate air gaps and large air gaps, respectively.
Figure 6B:
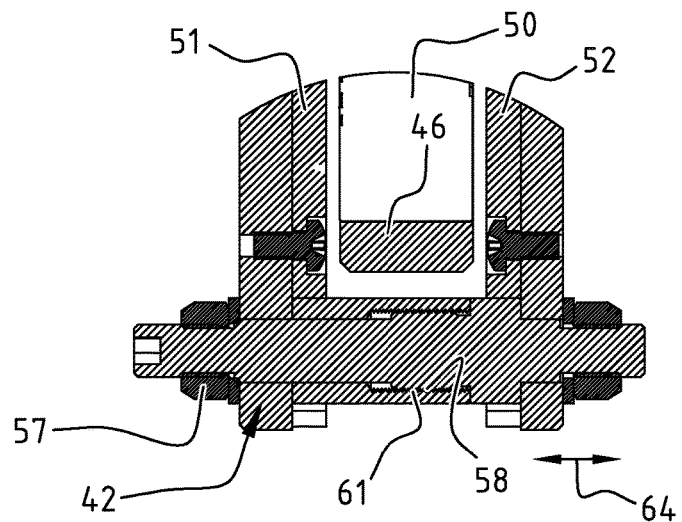
Figure 6C:
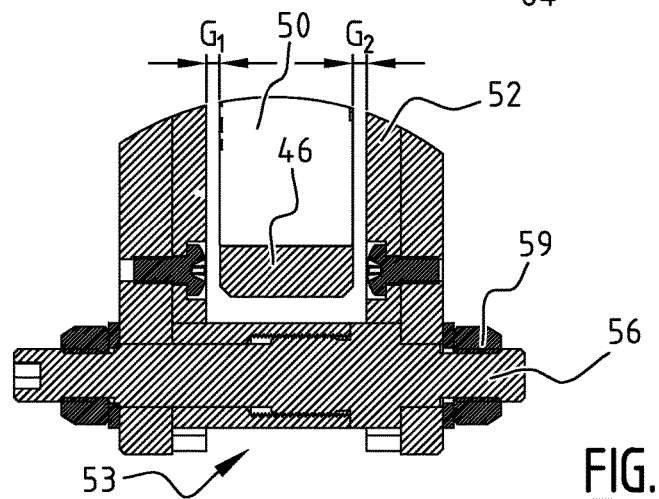
Figure 7:
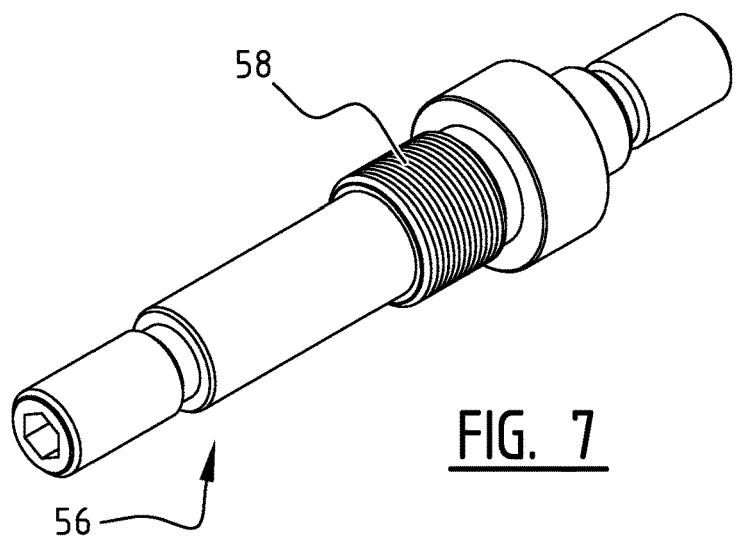
FIGS. 7-9 are views of embodiments of the connection unit.
Figure 8:
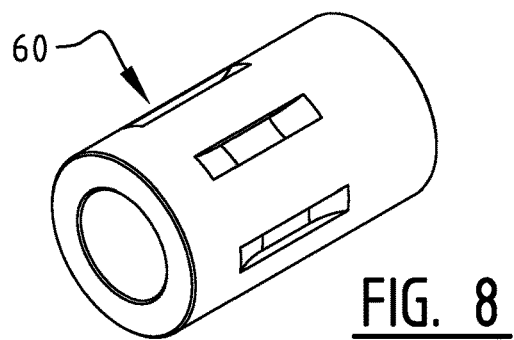
Figure 9:
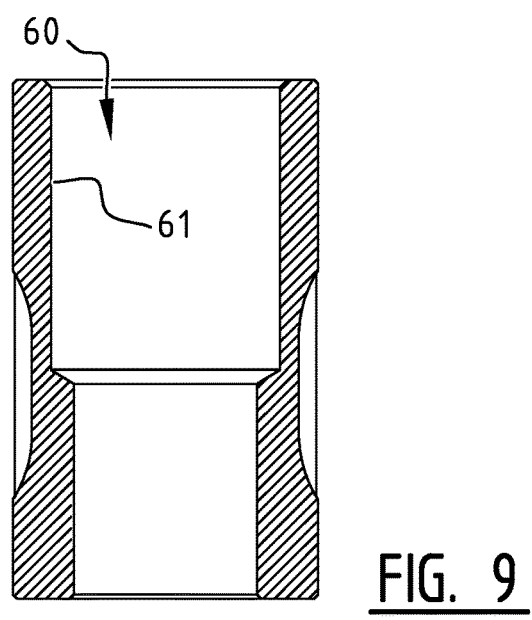

In the embodiment shown in the figures the connection unit 53 comprises a spacer, more specifically a spacer bolt, (assembly) configured to connect the inductor rotors with a fixed but adjustable space between them. The distance between the inductor surfaces of the electro-conductive material 51,52 minus the width of the magnet rotor 46 between them, amounts to the sum of the two air gaps ($G_1, G_2$, FIG. 6C). FIG. 6A shows a situation wherein the induction rotors are arranged relatively close to each other and the air gaps are relatively small FIGS. 6B and 6C represent situations wherein the induction rotors are displaced in an axial direction 64 to form larger air gaps $G_1, G_2$.

The figures show a spacer bolt 56 including two locknuts 57,59 at both ends. The locknuts and spacer bolt are threaded to allow the locknuts to be attached to the spacer bolt. The spacer bolt 56 is also externally threaded at a central area (cf. threaded portion 58). The figures also show a spacer sleeve 60. The spacer sleeve 60 is internally threaded (cf. threaded portion 61) to fit around the spacer bolt 56. Loosening the locknut 57 allows the spacer bolt 56 to be rotated in the spacer sleeve 60 to increase or decrease the distance between the conductors 51,52 (see direction of movement 64 in FIG. 5).

All spacer bolt assemblies are adjusted to the desired total distance and the locknuts are tightened again. Positioning the magnet 46 rotor in the center of the two inductor rotors 42,43 to equalize effective air gaps ($G_1, G_2$) is done after spacer bolt adjustment or, in case of large adjustments, also during the spacer bolt adjustment.

The adjustable connection units allow easy and accurate centering of the rotor between the inductor rotors, without having to reposition the complete motor or pump. For instance, the application (pump or other machine) may require another speed after installing the coupling as installed. Adjusting the air gap allows a lower or higher output speed. The connection units enable setting the inductor distance, moving one inductor rotor towards or away from the other inductor rotor. After this the magnet rotor may be at an off center position between the inductor rotors. The magnet rotor may then be centered again with the earlier described axial displacement mechanism of the inner and outer hub parts. This repositions the coupling assembly in axial direction.

Figure 10:
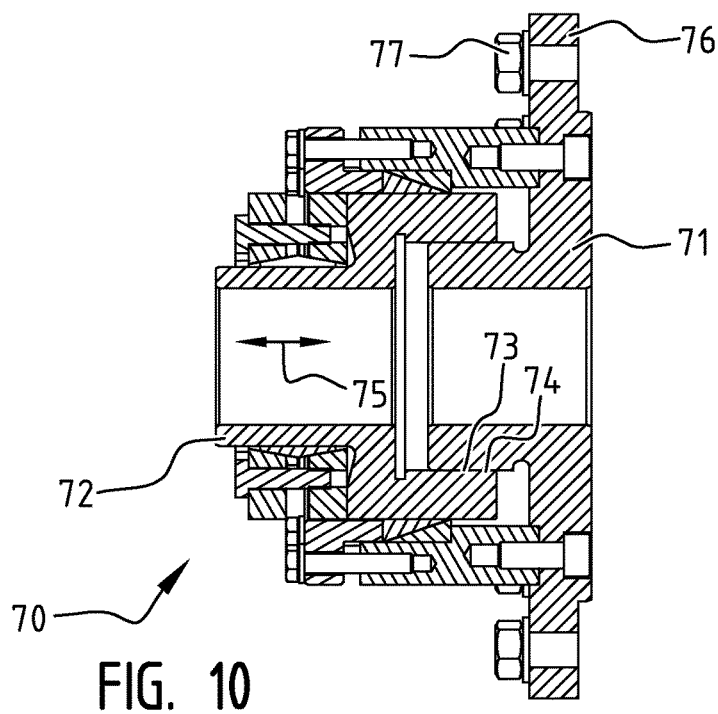
FIGS. 10 and 11 are a view in perspective and in cross-section of a further embodiment of the invention.
Figure 11:
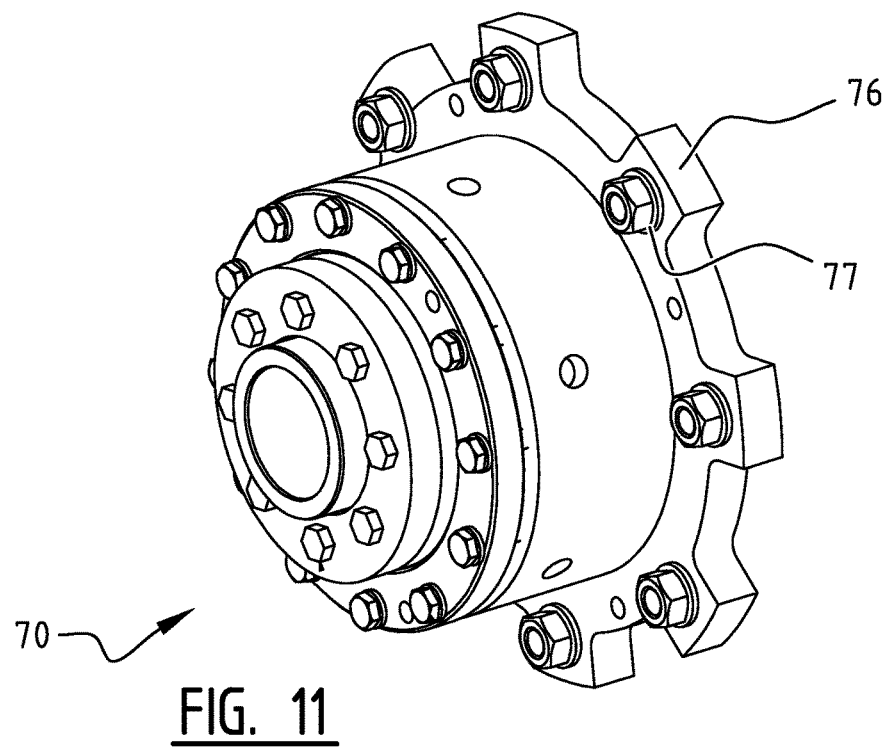

FIGS. 10 and 11 show another embodiment of a magnetic coupling assembly 70. For a large part the assembly 70 corresponds to the assemblies of FIGS. 1-9 and for a detailed description certain elements of the present embodiment reference is made to the earlier described assemblies. The assembly 70 comprises an inner hub part 71 and an outer hub part 72. The outer hub part 72 is provided with thread 73 and the inner hub part 71 with thread 74, so that the outer hub part and inner hub part may be moved in axial direction 75 by rotating the outer hub part relative to the inner hub part. The inner hub part 71 includes a radial flange 76 that may be mounted to an inductor cage (not shown) using a number of bolts 77.

Figure 12A:
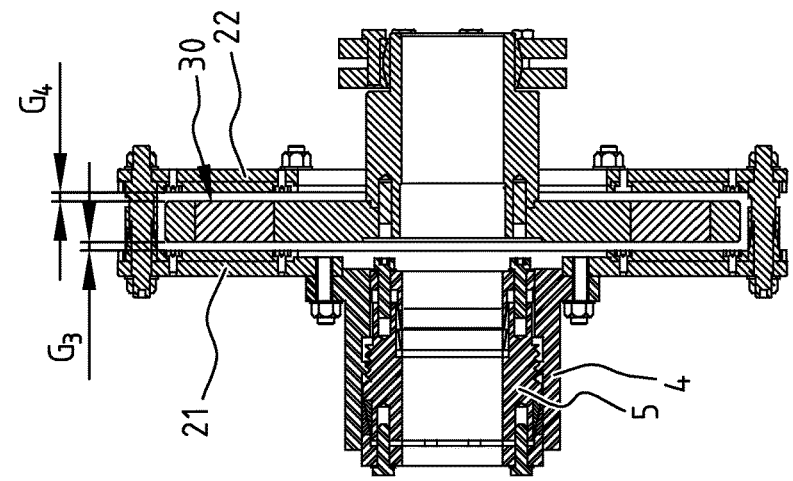
FIGS. 12A-12C show the schematic view of FIG. 1, in various states.
Figure 12B:
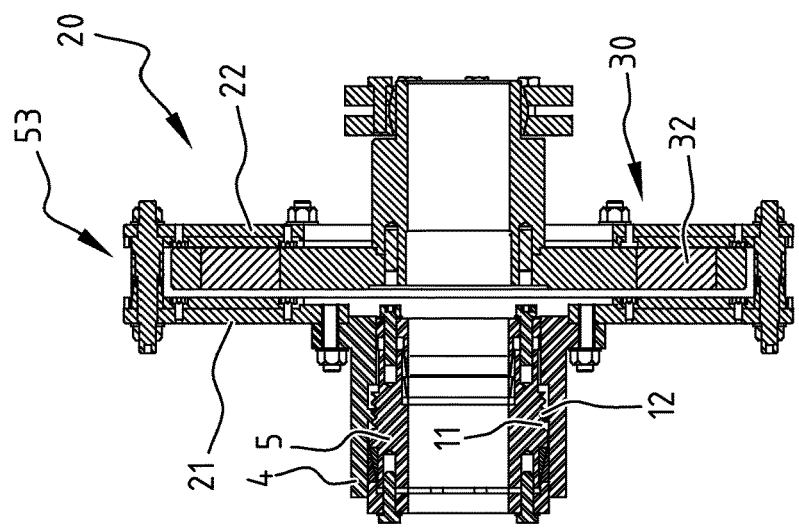
Figure 12C:
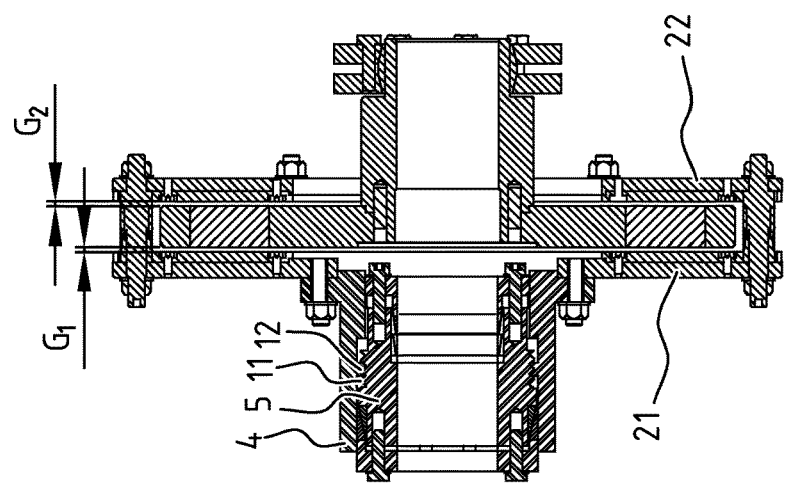

FIG. 12A shows the situation wherein the air gap ($G_1$) between the inductor rotor 21 and the side face of the magnet rotor 30 and the air gap ($G_2$) between the inductor rotor 22 and the side face of the magnet rotor 30 is the same. FIG. 12B shows the situation wherein the outer hub part 4 has been moved outward in axial direction (by rotation of the outer hub part 4 relative to the inner hub part 5) and has been fixed to the inner hub part 5 in the outwardly moved position. FIG. 12C shows the situation wherein the distance between the left inductor rotor 21 and the right inductor rotor 22 has been increased by operation of the connection units 52. The connection units may allow the distance between the inductor rotors 21, 22 to be increased in such a manner that the magnet rotor 30 is arranged centrally between the inductor rotors 21,22. More specifically, the air gap ($G_3$) between the inductor rotor 21 and the side face of the magnet rotor 30 and the air gap ($G_4$) between the inductor rotor 22 and the side face of the magnet rotor 30 may be the same (while $G_3=G_4>G_1=G_2$). While in this example first the axial position of the outer hub part 4 relative to the inner hub part 5 is changed (and therefore the entire conductor cage is axially displaced) and then the distance between the inductor rotors 21 and 22 is changed, in other examples the distance between the inductor rotors 21 and 22 is changed first and the axial position of the hub parts is changed thereafter. In still other examples the axial displacement of the conductor cage may be accomplished at the same time as the axial displacement of the inductor rotors.

The axially movable hub parts according to embodiments of the invention may be arranged at the drive side, the load side or both at the load and drive sides of the coupling.

The present invention is not limited to the embodiments thereof described herein. The rights sought are rather determined by the following claims, within the scope of which numerous modifications and adaptations can be envisaged.

The invention claimed is:

1. Magnetic coupling assembly for associating a first rotatable shaft to a second rotatable shaft, the magnetic coupling assembly comprising:
   a rotatable first hub to be connected to the first rotatable shaft;
   a rotatable second hub to be connected to the second rotatable shaft;
   a magnet rotor including a plurality of permanent magnets, the magnet rotor coupled to the second hub; and
   a conductor housing including:
      a first inductor rotor connected to the first hub and arranged at a first distance from a first side of the magnet rotor;
      a second inductor rotor arranged at a second distance from a second side of the magnet rotor; and
         at least one connector unit for connecting the first inductor rotor to the second inductor rotor, the at least one connector unit being configured to control an axial distance between the first and second inductor rotors; and
   wherein at least one of the first hub and the second hub is configured to allow axial movement relative to the first or second rotatable shaft, respectively, in order to adjust an axial position of the first and second inductor rotors relative to the magnet rotor; and
   wherein the first inductor rotor is positioned relative to the first side of the magnet rotor and the second inductor rotor is positioned relative to the second side of the magnet rotor so as to define respective first and second air gaps between the first and second inductor rotors and the magnet rotor, respectively, a width of the first and second air gaps are configured to be independently controlled by a combination of adapting a position of the first and second inductor rotors relative to the magnet rotor by moving the first or second hub relative to the first or second shaft, respectively, and adapting the axial distance between the first and second inductor rotors by changing a length of the at least one connector unit.

2. Magnetic coupling assembly claimed in claim 1, wherein the at least one connector unit comprises a spacer configured to be connected to an inner surface of the first inductor rotor and an inner surface of the second inductor rotor, the spacer being configured to position the first and second inductor rotors relative to each other at a selected axial distance from a plurality of axial distances.

3. Magnetic coupling assembly as claimed in claim 1, wherein the at least one connector unit comprises a spacer assembly comprising a spacer configured to control the axial distance between the first and second inductor rotors.

4. Magnetic coupling assembly as claimed in claim 1, wherein the conductor housing is configured to at least partly surround the magnet rotor, the magnet rotor extending within the conductor housing in a radial direction relative to the axial direction defined by the first and second hubs.

5. Magnetic coupling assembly as claimed in claim 1, wherein the conductor housing is connected to the first hub.

6. Magnetic coupling assembly as claimed in claim 1, wherein the first hub includes a hub part and an inner hub part, the magnet rotor is connected to the second hub and the conductor housing is connected to the hub part of the first hub.

7. Magnetic coupling assembly as claimed in claim 1, wherein the first hub includes a hub part and an inner hub part, the magnet rotor is connected to the hub part of the first hub and the conductor housing is connected to the second hub.

8. Magnetic coupling assembly claimed in claim 1, wherein the at least one of the first hub and the second hub is configured to allow axial movement relative to the first or second rotatable shaft, respectively, via including a hub part and an inner hub part, wherein the hub part and the inner hub part are configured to allow the hub part to be axially movable with respect to the inner hub part to adjust the axial position of the first and second inductor rotors relative to the magnet rotor.

9. Magnetic coupling assembly as claimed in claim 8, wherein the width the first and second air gaps are configured to be independently controlled by a combination of adapting the position of the first and second inductor rotors relative to the magnet rotor by moving the hub part relative to the inner hub part and adapting the axial distance between the first and second inductor rotors by changing the length of the at least one connector unit.

10. Magnetic coupling assembly as claimed in claim 8, further comprising at least one fixation element configured to fixate the inner hub part relative to the hub part at an axially moved position.

11. Magnetic coupling assembly as claimed in claim 10, wherein the at least one fixation element comprises a clamping device configured to clampingly attach the hub part to the inner hub part.

12. Magnetic coupling assembly as claimed in claim 10, wherein the at least one fixation element comprises:
   a conical element positioned between the hub part and the inner hub part and at least partly surrounding the inner hub part; and
   a pressing element configured to be inserted between the conical element and at least one of the hub part and the inner hub part.

13. Magnetic coupling assembly as claimed in claim 8, wherein the hub part and the inner hub part are configured to move the hub part and the inner hub part relative to one another by rotating the hub part relative to the inner hub part.

14. Magnetic coupling assembly as claimed in claim 1, wherein the at least one of the first hub and second hub is configured to allow axial movement relative to the first or second rotatable shaft, respectively, via including a hub part configured to allow the hub part to be axially movable relative to the first or second rotatable shaft, respectively, in order to adjust the axial position of the first and second inductor rotors relative to the magnet rotor.

\* \* \* \* \*